May 17, 1938.  W. W. TIMMIS ET AL  2,117,998
ADJUSTABLE ORIFICE DEVICE
Filed Dec. 3, 1935
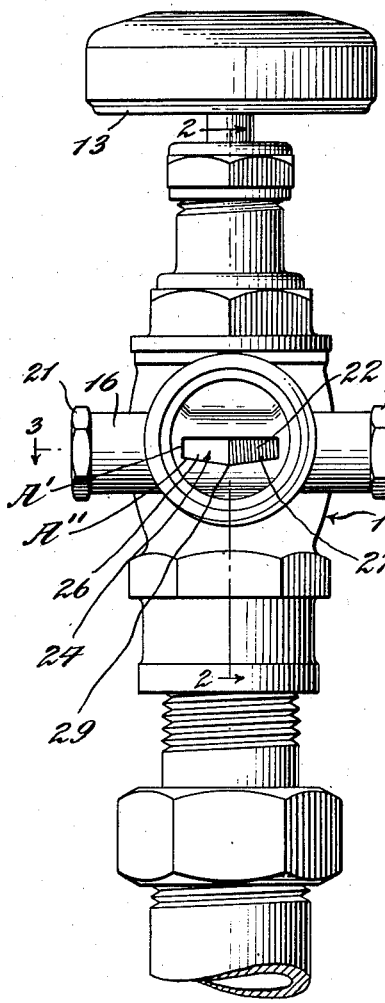
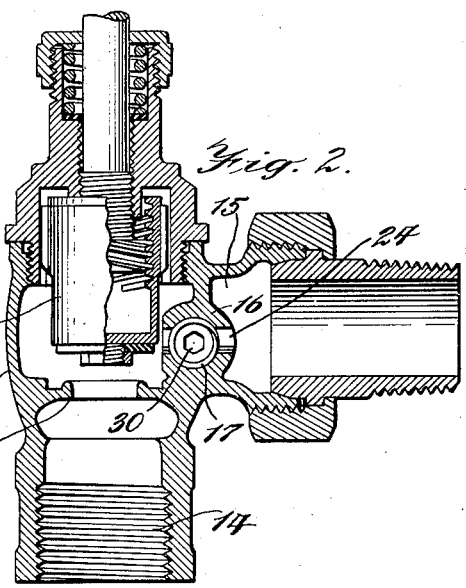
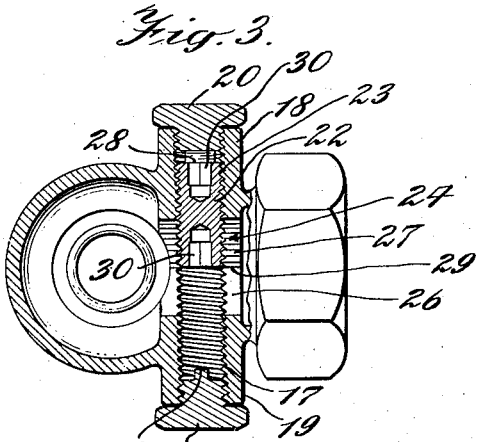
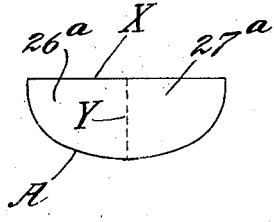
INVENTORS
William Walter Timmis
and William K. Walker
BY
their ATTORNEY.

Patented May 17, 1938

2,117,998

UNITED STATES PATENT OFFICE 2,117,998

ADJUSTABLE ORIFICE DEVICE

William Walter Timmis, Glen Cove, and William K. Walker, New York, N. Y., assignors to American Radiator Company, New York, N. Y., a corporation of New Jersey Application December 3, 1935, Serial No. 52,650

10 Claims. (Cl. 138—46)

Our invention relates to improvements in means for adjusting or regulating the metering orifices for radiators or other heat exchangers so as to control flow of operating fluid thereto in accordance with the demands, and the invention has for its object to provide a simple, efficient and reliable device which may be conveniently manipulated to regulate the rate of flow of operating fluid to the heat exchanger in accordance with the size or surface area thereof and the pressure under which the operating fluid is supplied.

Further, said invention has for its object to provide a device of the character specified in which the adjustable means thereof is capable of being manipulated from either side of the device, depending upon the relative position thereof when installed in place.

Further, said invention has for its object to provide a device of the character specified in which the orifice and the orifice area regulating means are coordinated so that equal increments of adjustment of the latter cause approximately equal variations in the flow of operating fluid at a given pressure.

Other objects will in part be obvious and in part be pointed out hereinafter.

In the accompanying drawing:

Figure 1 is an elevation of one form of device constructed according to and embodying the said invention;

Fig. 2 is a vertical section thereof on the line 2—2 of Fig. 1;

Fig. 3 is a horizontal section thereof on the line 3—3 of Fig. 1, and

Fig. 4 is a diagrammatical view of a double orifice having a shape established in accordance with a predetermined formula.

Referring to the drawing, the invention is shown for purposes of illustration as being associated with a known form of hand operated valve employed for controlling flow of operating fluid to a radiator, such valve being indicated at 10, and comprising a hollow body or casing 11 having an internal valve seat 12, adapted to be opened and closed by an adjustable valve member 13. Steam is supplied to the hollow body through a bottom inlet connection 14, and passes to the radiator through a tubular outlet 15 at the side of the body 11.

A partition or wall which includes a tubular portion 16 is formed integrally with the body 11 and is disposed between the body and the outlet connection 15 and in the path of the outgoing fluid, said partition and tubular portion, except for certain orifices to be presently described, intercepting the flow of fluid from the interior of the body 11 to and through the outlet connection 15. The tubular portion 16 extending transversely of the outlet 15, is internally threaded throughout the length thereof, as indicated at 17. The open ends 18 and 19 thereof are hermetically closed by the threaded closures or plugs 20 and 21 which constitute gauge stops for the traveller or orifice adjusting means 22 therein. The traveller 22 is preferably in the form of a cylindrical plug, and is screw-threaded throughout its length for engagement with the threads 17, as indicated at 23. The traveller 22 controls the effective area of the centrally located port or orifice 24 extending through the tubular portion 16 to allow passage of steam therethrough.

The orifice 24 consists of two duplicate halves or parts 26 and 27, each capable when fully open of allowing maximum flow of steam or operating fluid through the valve 10. The traveller 22 has a length substantially equal to the distance between the inner end 28 of either plug 20 or 21 and the medial line 29 of the double orifice 24. Hence, when the traveller 22 is in the position shown in the drawing, abutting the plug 20, the contiguous part 27 of the orifice is fully closed thereby, and the more remote part 26 is fully open. When it is desired to restrict the extent of opening of the orifice part 26, the plug 21 is removed and the traveller 22 is rotated or turned by means of a suitable tool inserted into the contiguous one of the tool-receiving sockets 30 provided at the opposite ends of the traveller 22. By rotating the traveller 22 the same is caused to move axially because of the threaded engagement to progressively restrict the extent of opening of the orifice part 26 in accordance with the number of turns given to the traveller. In like manner the traveller 22 is movable axially or longitudinally from the opposite position abutting the step plug 21 to control the extent of opening of the orifice part 27. With the duplicate orifice arrangement, as above described, the valve or fitting 10 may be connected either to the left-hand or the right-hand end of the radiator without interfering with the availability thereof for adjusting the orifice area, the traveller 22 being adjustable from either side of the valve.

The orifice parts 26 and 27 are shaped in accordance with a predetermined formula for the flow of fluid through an orifice so that for a given pressure differential equal axial movements of the traveller 22 cause equal changes in the flow of steam. The flow is expressed in square feet of radiating surface, each square foot condensing about a quarter of a pound of steam per hour. Each turn of the screw traveller 22 produces approximately the same change in the rate of flow of steam so that the flow rate varies substantially as a straight line function of the axial movement of the traveller 22.

If the steam flow for satisfying the requirements of a given radiator and the pressure differential at which said steam is supplied to the radiator are known, the orifice area required is determinable. Steam is supplied to a radiator system under differential pressures ranging usually from one-half pound to two and one-half pounds per square inch. The slot-like or elongated form of the orifice part 26 or 27 is particularly adapted for co-operation with the axially movable orifice area adjusting member 22. We have found by test that the area of an orifice of the general form employed varies in accordance with the following formula:

$$(1) \quad A = \frac{.00033 F^{1.19}}{D^{.613}}$$

in which A is the orifice area in square inches, F the flow, as above defined, and D the differential pressure of the steam in pounds per square inch across the device.

In the present invention, the orifice is designed so that $$(2) \quad F = Cx$$

i. e., the flow F is made directly proportional to the orifice length, as determined by the travel of the member 22, and designated by $x$. Hence:

$$(3) \quad C = \frac{F}{x}$$

The value of C is determined by the change in flow F desired per increment of movement of the traveller 22. As one example, a change of flow of ten quarter pound feet of radiation as above defined per turn of the member 22 is a convenient relationship. Assuming that the screw traveller 22 has twenty-nine threads to the inch, the traveller 22 moves one twenty-ninth of an inch per turn to vary the flow ten quarter pound feet of radiation—hence the value of the constant C is determinable. By substituting $Cx$ for F in Formula (1), we obtain:

$$(4) \quad A = \frac{.00033 C^{1.19}}{D^{.613}} x^{1.19}$$

In Formula (4) the value of C is known and the device or valve 10 is designed for a known or given pressure differential D, preferably a one pound pressure differential—hence, the first term of Formula (4) is a constant M and Formula (4) becomes:

$$(5) \quad A = M x^{1.19}$$

Fig. 4 represents diagrammatically a simple form of double orifice for satisfying the terms of the above formulae upon adjustment of the traveller 22, the two parts of the orifice being indicated at 26ᵃ and 27ᵃ. Each part is defined by a straight line edge X and a curving line edge A. The double orifice decreases in width from the center thereof towards the ends, and the variable widths are indicated by Y and are measured at the end of the traveller 22.

In designing an orifice with one edge uniformly straight and the other corresponding to an exponential curve satisfying the condition of Formula (5), the curve as plotted on coordinate paper has an axis of abscissas $x$ denoting the orifice lengths as determined by the variations in distance of travel of the orifice adjusting member 22 and an axis of ordinates $y$ denoting the variations in the width of the orifice at the end of the traveller 22 required to give orifice areas satisfying the conditions. The formula for plotting the exponential curve is:

$$(6) \quad y = \frac{.000392 C^{1.19} x^{.19}}{D^{.613}}$$

in which C is the constant of Formula (3) above, $x$ the value determined by the travel of the member 22, D the differential pressure, and $y$ the ordinates values for establishing the points on the curve relative to the abscissas $x$. In the foregoing Formula (6), the differential pressure is known, say, a one pound pressure differential, and the value of C is known—hence, Formula (6) may be expressed as follows:

$$(7) \quad y = L x^{.19}$$

in which $y$ represents the width of the orifice at the end of the traveller 22 and $x$ the length of the open portion of the orifice beyond the end of the traveller 22. The constant L is about .333 when twenty-nine threads per inch are employed to give a variation in flow of ten quarter pound feet per turn at one pound pressure differential.

In practice, the curving edge A is modified, for facilitating the manufacture and machining, by substituting therefor the angularly related edges A' A'' (Fig. 1) approximating chords of said curve A and forming an orifice substantially conforming to Formula (7), as well as the other formulae. The length of the end edge A' and the inclination of the edge A'', which is disposed substantially at an angle of 5° relative to the edge X, are such as to provide an orifice conforming to Formula (7), when the constant L has the value of about .333.

In operation, when the screw traveller 22 is backed away one turn from the stop 20, the length X of the orifice is reduced in proportion to the axial movement of the screw 22, and the width Y attained at the end of the traveller 22 is such as to give the orifice area required. With twenty-nine threads to the inch, the dimensions are so chosen that each turn of the traveller 22 produces, assuming that the pressure differential is one pound, substantially the same change of steam flow, say, ten quarter pound feet, as above defined. In adjusting the orifice area, the traveller 22 is initially in engagement with either stop 20, 21, and is then backed off the required number of turns to correspondingly reduce the orifice area to set the same in accordance with the area of the radiator. This is accomplished by removing the remote plug 20—21 and then turning the traveller by means of a suitable tool.

The metering orifice designed in accordance with the formulae of the present invention, is capable of accurate adjustment within the range of pressure differentials ordinarily encountered in heating practice, and is capable of application to radiators of different capacities, ranging from a few square feet to a hundred square feet or more of radiating surface.

By our invention the metering orifice for each radiator may be readily sized or adjusted in area from either side of the valve 10 after the installation thereof.

By adjusting the traveller 22 in accordance with data on a chart furnished for that purpose, the orifice area, and hence the steam flow, can be accurately gauged to radiators supplied with steam at pressure differentials across the valve 10 differing one from the other within the usual range above referred to. The orifice area may also be adjusted with the aid of a gauge calibrated to read directly in terms of steam flow.

What we claim and desire to secure by Letters Patent of the United States is:—

1. A device of the character described, comprising a body having an orifice opening therein, a member movable in parallel relation to said opening and having a range of travel extending beyond the opposite sides of said opening to allow clearance of said opening at either side thereof, and means at both ends of said member for adjusting the same.

2. A device of the character described, comprising a body having an elongated opening therein constituting juxtapositioned duplicate orifice portions, and a member having a range of movement longitudinally of said opening extending beyond both sides thereof for regulating the extent of opening of either of said orifice portions while retaining the other of said orifice portions closed.

3. A device of the character described, comprising a body having a tubular portion thereon provided with an intermediate, lateral opening therein constituting juxtapositioned duplicate orifice portions, and a member disposed within said tubular portion for axial movement therein over a range extending beyond both sides of said opening for allowing regulation of the extent of opening of either orifice portion.

4. A device of the character described, comprising a body having a working passage and an intermediate, elongated opening therein constituting juxtapositioned duplicate orifice portions, and a member adjustable axially of said working passage for regulating said orifice portions, the working passage of said member and said member being coordinated in length to allow regulation of either orifice portion while retaining the other thereof closed.

5. A fitting for radiator steam lines, comprising a flow-intercepting wall part including a tubular portion extending transversely across the interior of the fitting from one side thereof to the opposite side thereof, and being open at both of its ends to the exterior of the fitting; said tubular portion having an orifice opening through the side thereof for the passage of steam from one side of said wall part to the other side thereof; a member movable axially of said tubular portion for regulating the size of said orifice, and including means providing for effecting its axial movement from either open end of said tubular portion.

6. A fitting for radiator steam lines, comprising a flow-intercepting wall part including a tubular portion extending transversely across the interior of the fitting from one side thereof to the opposite side thereof, and being open at both of its ends to the exterior of the fitting; removable closures for the open ends of said tubular portion; said tubular portion having an orifice opening through the side thereof for the passage of steam from one side of said wall part to the other side thereof; a member movable axially within said tubular portion for regulating the size of said orifice, and including means at each end thereof providing for effecting its axial movement from either open end of said tubular portion when its respective closure is removed therefrom.

7. A fitting for radiator steam lines, comprising a flow-intercepting wall part including a tubular portion extending transversely across the interior of the fitting from one side thereof to the opposite side, and being open at both of its ends to the exterior of the fitting; said tubular portion having an orifice opening through the side thereof for the passage of steam from one side of said wall part to the other side thereof; a member movable axially within said tubular portion for regulating the size of said orifice, and including means providing for effecting its axial movement from either open end of said tubular portion; and a removable closure for each of the open ends of said tubular portion for permitting access to the ends of said member; each of said removable closures serving, when in position in its respective end of the tubular portion, as a stop for limiting the travel of said member in one direction.

8. A fitting for radiator steam lines, comprising a flow-intercepting wall part including an internally threaded tubular portion extending transversely across the interior of the fitting from one side thereof to the opposite side, and being open at both of its ends to the exterior of the fitting; said tubular portion having an orifice opening through the side thereof for the passage of steam from one side of said wall part to the other side thereof; an externally threaded member in threaded engagement with the interior of said tubular portion and movable axially thereof to regulate said orifice; said member having tool-engaging means at both ends thereof; and removable closures for the open ends of said tubular portion.

9. A fitting for radiator steam lines, comprising a flow-intercepting wall part including a tubular portion extending transversely across the interior of the fitting from one side thereof to the opposite side thereof, and being open at both of its ends to the exterior of the fitting; said tubular portion being provided with an intermediate elongated opening through the side thereof and forming duplicate orifice portions with each of the orifice portions being of a size to permit maximum flow of steam from one side of said wall part to the opposite side thereof; an axially movable member having screw-threaded engagement with the interior of said tubular portion for regulating flow of steam through said opening, and being of a length as great as that of said lateral opening and having tool-engaging means on the opposite ends thereof; and removable closures for the ends of said tubular portions; said closures constituting stops forming, when in place, an effective working passage for said member within said tubular portion, having a length substantially equal to twice the length of said member.

10. A fitting for radiator steam lines, comprising a body having a working passage and an intermediate elongated opening therein; said opening having a substantially straight longitudinal edge and an opposing edge converging from the center thereof towards said straight edge to form juxtaposed duplicate orifice portions of progressively decreasing width towards the ends thereof; and a member having a range of movement longitudinally of said opening extending beyond both ends thereof for regulating the extent of opening of either of said orifice portions while retaining the other of said orifice portions closed.

WILLIAM WALTER TIMMIS.
WILLIAM K. WALKER.